Jan. 1, 1929.

T. M. LILLEBERG 1,697,532

PIPE MACHINE

Original Filed Feb. 21, 1927

Inventor:
Tideman M. Lilleberg,
By Dyrenforth, Lee, Chritton & Wiles,
Attys.

Patented Jan. 1, 1929.

1,697,532

UNITED STATES PATENT OFFICE.

TIDEMAN M. LILLEBERG, OF CHICAGO, ILLINOIS, ASSIGNOR TO THE NYE TOOL & MACHINE WORKS, OF CHICAGO, ILLINOIS, A CORPORATION OF ILLINOIS.

PIPE MACHINE.

Original application filed February 21, 1927, Serial No. 169,982. Divided and this application filed December 3, 1927. Serial No. 237,503.

My invention relates, more particularly, to the means provided in pipe machines for supporting and rotating the pipe during the operations performed thereon, as for example, the operation of threading the pipe, cutting off portions of the pipe, and removing burrs therefrom, or any of these operations, the present application being a division of my pending application for U. S. Letters Patent Serial No. 169,982, filed February 21, 1927.

One of my objects is to provide improvements in the pipe supporting and rotating means of pipe machines, to the end that the pipe may be readily introduced into the desired position therein and which is of particular advantage where long pipes are to be operated on.

Another object is to provide novel, simple, and positively operating mechanism for centering and clamping the pipe in the machine; and other objects as will be manifest from the following description.

Referring to the accompanying drawings:—

Figure 1:
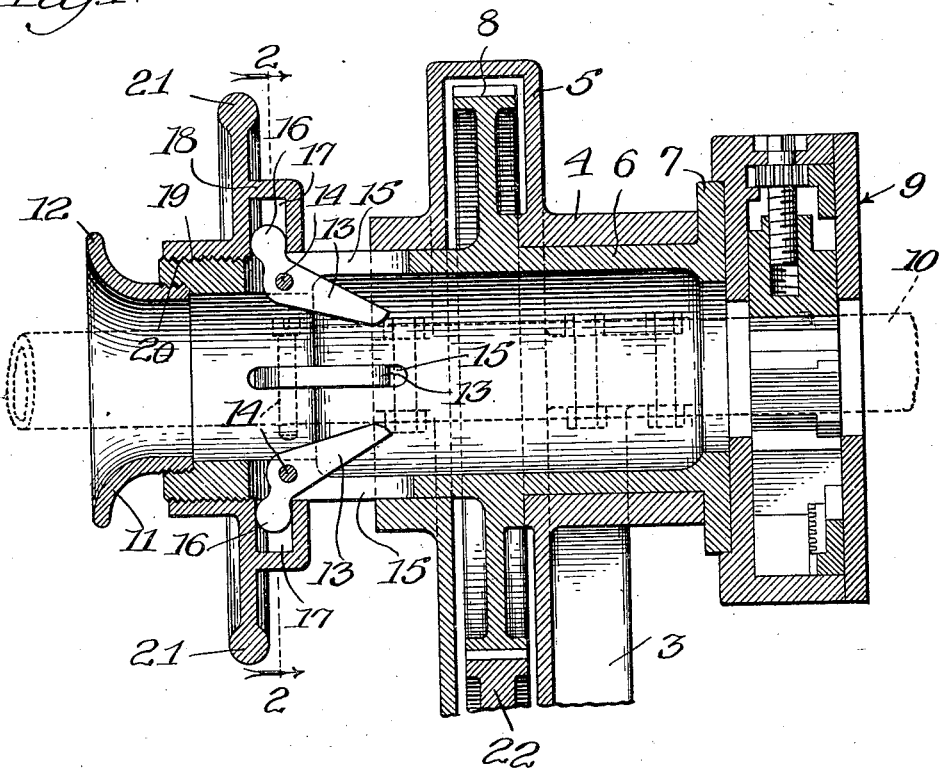
Figure 2:
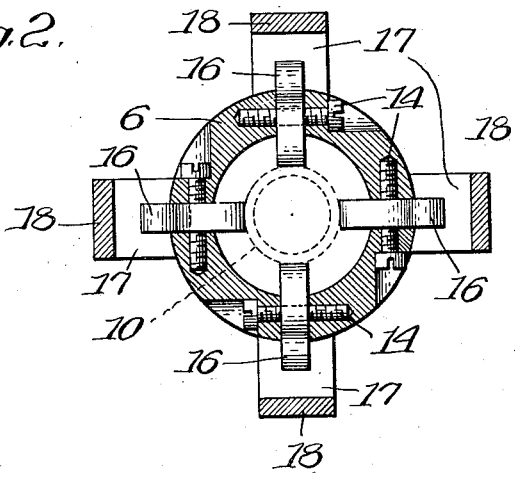

Figure 1 is a view in longitudinal sectional elevation of the clamp supporting and rotating mechanism of a pipe machine, constructed in accordance with my invention; and Figure 2, a sectional view taken at the line 2—2 on Fig. 1 and viewed in the direction of the arrows, the drawing showing only those parts of the machine in which my invention is embodied together with the bearing portion of the frame of the machine in which the parts referred to are mounted, it being understood that my improvements may be incorporated in any pipe machine involving means for rotating the pipe to be operated on.

Referring to the construction shown, the upper end portion of one end of the frame of the pipe machine is represented at 3 and is provided with a tubular portion 4 forming a journal bearing containing between its ends a circumferential hollow extension 5. Rotatably mounted in the journal 4 is a tubular head 6 provided at one end with a circumferential outwardly extending flange 7 overlapping one end of the journal bearing 4 and between its ends with a gear 8 located in the housing 5. The end of the head 6 provided with the flange 7, carries chuck mechanism represented generally at 9 and which may be of any desirable construction, rigidly secured to the flange 7 and adapted to clamp a pipe, such as that represented at 10, in centralized position relative to the head 6, the chuck mechanism shown being of common and well-known construction and therefore need not be described. The opposite end of the head 6 is provided with an internally flared portion 11 shown as provided on a member separate from the body of the head 6 and represented at 12, this member being screwed into the open end of the head 6.

The head 6 is provided with an auxiliary pipe-centering and clamping mechanism comprising a plurality of fingers 13 disposed radially about the longitudinal axis of the head 6 and pivoted thereto at 14 to adapt them to be rocked in radial slots 15 in the side wall of the head, these fingers being provided with rounded extensions 16 extending at an angle to the main portions of these fingers and located in an annular groove 17 provided about the inner side of a ring member 18 having threaded connection at internal threads 19 thereon with the externally threaded portion 20 of the head 6, the ring 18 being provided with a hand wheel 21 by which it may be rotated on the head 6. By providing engagement between the fingers 13 and the ring member 18 as stated, these fingers are rocked in one direction or the other depending upon the direction of rotation of the member 18, to simultaneously move the inner ends of these fingers relative to each other, rotation of the member 18 in clockwise direction in Fig. 2 operating to move the inner ends of the fingers 13 inwardly toward the longitudinal axis of the head 6 and reverse rotation of this member moving them in the opposite direction.

The head 6 is rotated for rotating the pipe 10 in clamped position therein, by any suitable means, as for example through gear mechanism actuated by a motor and meshing with the gear 8, a showing of the gear drive mechanism being omitted, except for a portion of one of the gears thereof represented at 22. In the use of a pipe machine embodying my illustrated improvements, the operator introduces the end of the pipe 10 to be operated on, into the head 6, at the left-hand end thereof in Fig. 1, the outwardly flared portion 11 of the head aiding in thus introducing the pipe into the head, and slides it between the guide fingers 13 and into, and through, the chuck 9, the guide fingers 13 operating to prevent the end of the pipe from striking the chuck mechanism, these fingers being preferably tightened upon the pipe for thus positioning the latter by screwing up the actuating ring 18. In practice, the operator, in removing the pipe from the machine after it has been operated on as for example cut and threaded, would operate the ring 18 only to such an extent as to cause the fingers 13 to release their grip on the pipe so that in introducing another pipe into the machine these fingers would be in such position as to properly guide the pipe through the chuck.

While I have illustrated and described a particular illustrated embodiment of my invention, I do not wish to be understood as intending to limit it thereto, as the same may be variously modified and altered without departing from the spirit of my invention.

What I claim as new, and desire to secure by Letters Patent, is:

1. In a pipe-machine, the combination of a hollow rotatable head adapted to receive the pipe, means for clamping said pipe in said head, and means located between said first-named means and the outer end of said head for centering the pipe in said head and adapted to be moved into a position for clamping against the pipe, said last-named means comprising separate members adapted to be moved toward and away from the pipe and means for simultaneously moving said members relative to the pipe.

2. In a pipe-machine, the combination of a hollow rotatable head adapted to receive the pipe, and centering means for the pipe comprising a plurality of fingers pivotally connected with said head and grouped about the axis of the latter, and means operatively engaged with said fingers for simultaneously swinging them on their pivots.

3. In a pipe-machine, the combination of a hollow rotatable head adapted to receive the pipe, and centering means for the pipe comprising a plurality of fingers pivotally connected with said head and grouped about the axis of the latter, and means movable along said head and operatively engaging with said fingers for simultaneously swinging them on their pivots.

4. In a pipe-machine, the combination of a hollow rotatable head adapted to receive the pipe, means for clamping said pipe in said head, comprising a plurality of fingers pivotally connected with said head and grouped about the axis of the latter, and means having threaded engagement with said head and operatively engaging with said fingers for simultaneously moving them on their pivots.

5. In a pipe-machine, the combination of a hollow rotatable head adapted to receive the pipe, means for clamping said pipe in said head, a grooved member on said head into which portions of said fingers extend whereby movement of said ring lengthwise of said head simultaneously swings said fingers on their pivots, and means for holding said member in adjusted position.

6. In a pipe-machine, the combination of a hollow rotatable head adapted to receive the pipe, and centering means for the pipe comprising a plurality of fingers pivotally connected with said head and grouped about the axis of the latter, and a ring having threaded engagement with said head and containing an annular groove, said fingers being provided with outwardly extending portions extending into said groove, for the purpose set forth.

7. In a pipe-machine, the combination of a hollow rotatable head adapted to receive the pipe, and centering means for the pipe comprising a plurality of members mounted on said head for adjustment toward and away from the axis of said head, the inner edge portions of said members inclining toward the axis of said head in a directon away from the inlet end of said head.

TIDEMAN M. LILLEBERG.